(12) United States Patent
Matsui

(10) Patent No.: US 6,471,504 B1
(45) Date of Patent: Oct. 29, 2002

(54) ROBOT FOR PRODUCTION MACHINE

(75) Inventor: Atsuo Matsui, Nagano (JP)

(73) Assignee: Nissei Plastic Industrial Co., Ltd., Nagano-Ken (JP)

(*) Notice: Subject to any disclaimer, the term of this patent is extended or adjusted under 35 U.S.C. 154(b) by 0 days.

(21) Appl. No.: 09/496,646

(22) Filed: Feb. 3, 2000

(30) Foreign Application Priority Data

Feb. 10, 1999 (JP) ............................................. 11-032346

(51) Int. Cl.⁷ .............................................. B29C 45/42
(52) U.S. Cl. ...................... 425/556; 414/728; 414/733; 414/738; 425/436 R; 901/15; 901/23; 901/25
(58) Field of Search ................................ 425/554, 556, 425/438, 444, 436 R; 901/15, 17, 23, 25; 414/728, 733, 738

(56) References Cited

U.S. PATENT DOCUMENTS

| | | | | |
|---|---|---|---|---|
| 4,600,355 A | * | 7/1986 | Johnson ........................ | 901/15 |
| 4,795,124 A | * | 1/1989 | Nagai .......................... | 425/556 |
| 4,813,846 A | * | 3/1989 | Helms ......................... | 901/23 |
| 4,901,589 A | * | 2/1990 | Gaigl .......................... | 425/556 |
| 4,947,702 A | * | 8/1990 | Kato ........................... | 901/23 |
| 5,106,258 A | * | 4/1992 | Orii ............................. | 901/15 |

FOREIGN PATENT DOCUMENTS

| | | |
|---|---|---|
| JP | Y2445861 | 10/1992 |
| JP | Y2540989 | 10/1993 |

* cited by examiner

Primary Examiner—Jan H. Silbaugh
Assistant Examiner—Joseph Leyson
(74) Attorney, Agent, or Firm—Birch, Stewart, Kolasch & Birch, LLP

(57) ABSTRACT

A first base-side pulley is disposed at the base portion of a first arm portion; a first distal-side pulley is disposed at the distal portion of the first arm portion; a second base-side pulley is disposed at the base portion of a second arm portion; a second distal-side pulley is disposed at the distal portion of the second arm portion; the first base-side pulley is fixed to the support base; the chuck is fixed to the second distal-side pulley; the first distal-side pulley and the second base-side pulley are connected to each other via a connection shaft; the first base-side pulley and the first distal-side pulley are connected to each other via a first rotation transmission section; and the second base side pulley and the second distal-side pulley are connected to each other via a second rotation transmission section. Thus, an articulated robot arm having first and second arm portions is constructed. Since the first base-side pulley is fixed and does not rotate, the chuck has a constant orientation regardless of variations in the rotational angles of the first and second arm portions.

6 Claims, 4 Drawing Sheets

ROBOT FOR PRODUCTION MACHINE

BACKGROUND OF THE INVENTION

1. Field of the Invention

The present invention relates to a robot for a production machine which is used as a product removal apparatus for removing products from a production machine such as an injection molding machine, or as an insert-part-loading apparatus for loading an insert part into a mold or the like.

2. Description of the Relevant Art

There has been known a product removal apparatus (robot for a production machine) which removes a product ejected from a mold of an injection molding machine and transports the product to a product container disposed adjacent to the injection molding machine.

A conventionally-used product removal apparatus is a traverse-type product removal apparatus which is designed to move linearly a chuck capable of holding and releasing a product along X, Y, and Z directions. However, such a traverse-type product removal apparatus involves a drawback in that since the apparatus must have a size corresponding to the stroke of movement of the chuck along each direction, the apparatus is comparatively large overall, and an installation space corresponding to the stroke of movement is required.

In order to solve the above-described drawback, Japanese Utility Model Publication Nos. 4 (1992)-45861, 5 (1993)-40989, and others propose an improved product removal apparatus in which an articulated robot having a plurality of linked arm portions is used in order to reduce movement area to thereby reduce the size and installation space.

Meanwhile, a mold clamp apparatus of an injection molding machine includes four tie bars, which slidably support a movable platen to which is attached a movable die. Therefore, a molded product must be removed through a space between the tie bars without causing interference with the tie bars. Accordingly, the chuck of a product removal apparatus must be moved linearly at lest along the vertical direction, and the chuck must be maintained in a constant posture (orientation). In the case of the above-described articulated robot, since fundamental motions are produced by means of rotation of respective joint portions, when the chuck is to be moved linearly, two arm portions must be moved in a combined manner through simultaneous control of rotational angles of the two arm portions.

However, when a chuck is secured to a distal end of an articulated arm, the orientation of the chuck changes depending on the rotational angles of the arm portions. Therefore, the conventional product removal apparatus of the articulated robot type which has been provided in injection molding machines requires an additional drive mechanism for correcting the orientation of the chuck. This results in an increase in the number of parts, an increase in difficulty in designing a control system, and an increase in cost stemming from an increased degree of complexity of hardware and software. Further, the overall size and weight of the part removal apparatus increase.

SUMMARY OF THE INVENTION

An object of the present invention is to provide a robot for a production machine which is advantageously disposed in an injection molding machine and which can stably and smoothly remove a molded product through a space between tie bars without causing interference with the tie bars, even when the molded product is large.

Another object of the present invention is to provide a robot for a production machine which can simplify hardware and software to thereby reduce the overall cost of the apparatus, as well as the size and weight of the apparatus.

These and other objects are accomplished by a robot for a production machine comprising a support base; a first vertical arm portion having a first base portion supported on the support base; a first rotational drive section for rotating the first arm portion; a second vertical arm portion having a second base portion supported on a distal portion of the first arm portion, wherein said first and second vertical arms extend vertically in a direction parallel with a height of said support base and are rotatable in a direction normal to a horizontal direction of said support base; a second rotational drive section for rotating the second arm portion; a chuck supported on a distal portion of the second arm portion, wherein a first base-side pulley is disposed at the first base portion; a first distal-side pulley is disposed at the distal portion of the first arm portion; a second base-side pulley is disposed at the base portion of the second arm portion; and a second distal-side pulley is disposed at the distal portion of the second arm portion, wherein the first base-side pulley is fixed to the support base, the chuck is fixed to the second distal-side pulley, the first distal-side pulley and the second base-side pulley are connected to each other via a connection shaft, the first base-side pulley and the first distal-side pulley are connected to each other via a first rotation transmission section, and the second base-side pulley and the second distal-side pulley are connected to each other via a second rotation transmission section.

Thus, an articulated robot arm having first and second arm portions is constructed. The first arm portion is swung by means of the first rotational drive section, and the second arm portion is swung by means of the second rotational drive section. The chuck is fixed to the second distal-side pulley, and the second distal-side pulley is operatively connected to the first base-side pulley via a rotation transmission mechanism including the second rotation transmission section, the second base-side pulley, the first distal-side pulley, and the first rotation transmission section, and the first base-side pulley is fixed to the support base. That is, the chuck is operatively connected to the fixed first base-side pulley via a rotation transmission system independent of drive systems of the first and second arm portions. Therefore, when the diameter of the first base-side pulley is rendered the same as that of the first distal-side pulley and the diameter of the second base-side pulley is rendered the same as that of the second distal-side pulley, rotation of the first arm portion relative to the first base-side pulley is transmitted to the chuck as is, and rotation of the second arm portion relative to the first arm portion is transmitted to the chuck as is. Since the first base-side pulley is fixed and does not rotate, the chuck has a constant orientation regardless of variations in the rotational angles of the first and second arm portions.

DETAILED DESCRIPTION OF THE PREFERRED EMBODIMENT

Figure 1:
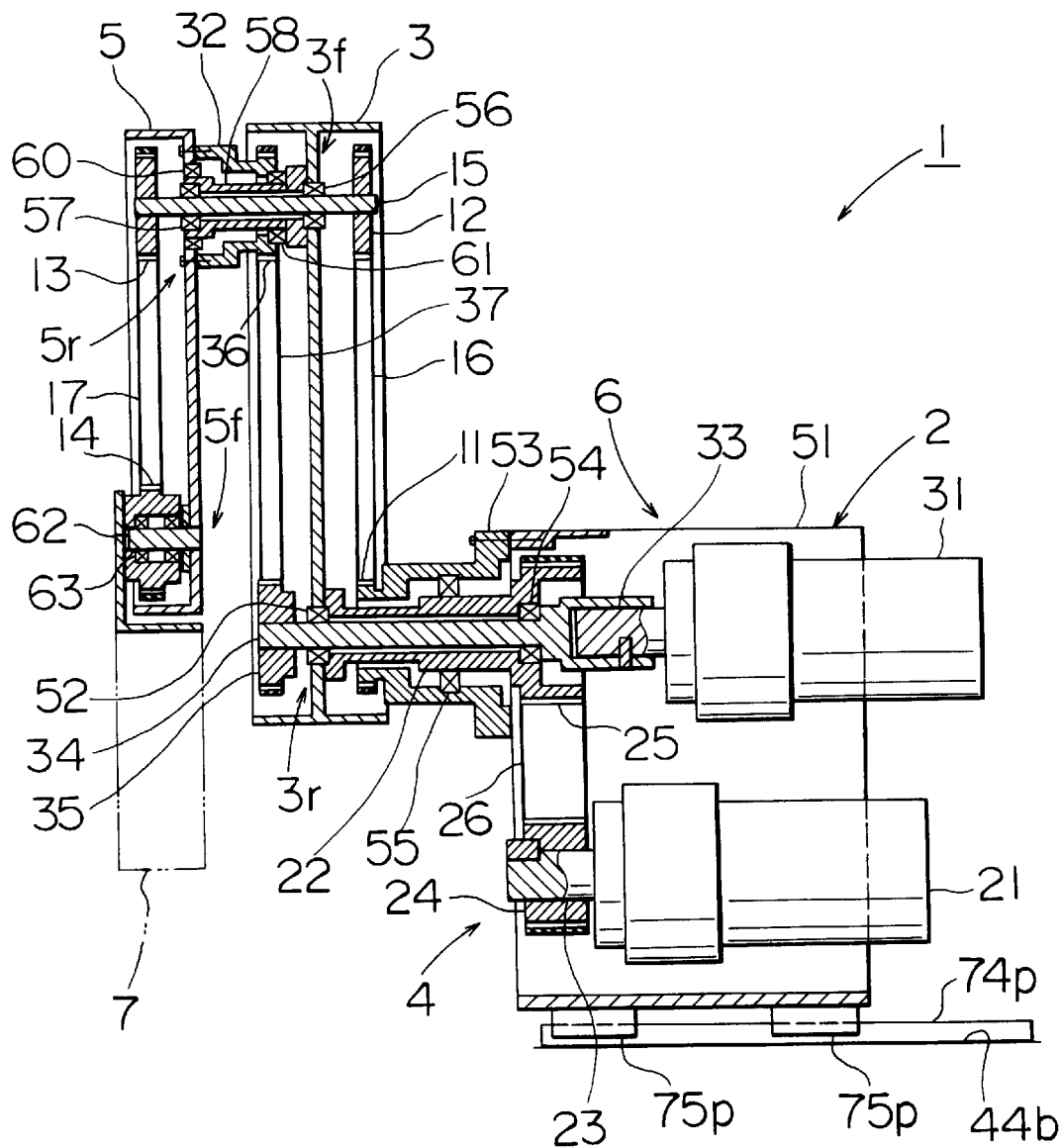
FIG. 1 is a partially sectioned side view of a product removal apparatus (robot for a production machine) according to an embodiment of the present invention.

An embodiment of the present invention will next be described in detail with reference to the drawings. The accompanying drawings are illustrative of the embodiments and are not meant to limit the scope of the invention. In order to describe the invention clearly, detailed description of known parts is omitted.

First, the structure of a product removal apparatus (robot for a production machine) 1 according to the embodiment will be described with reference to FIGS. 1 to 4.

The product removal apparatus 1 comprises a support base 2 including a housing 51. A first drive motor (servomotor) 21 is disposed in the housing 51 at a lower portion thereof, and a second drive motor (servomotor) 31 is disposed in the housing 51 at an upper portion thereof. A drive shaft 34 is coaxially connected to a motor shaft 33 of the second drive motor 31 and extends forward. An intermediate portion of the drive shaft 34 is rotatably coupled to a base portion 3r of a first arm portion 3 via a bearing 52. Further, a first tubular shaft 22 is disposed to surround the drive shaft 34, and a tubular bearing member 53 is disposed to surround the first tubular shaft 22. In other words, the first tubular shaft 22 is coaxially inserted into the outermost, largest tubular bearing member 53, and the drive shaft 34 is coaxially inserted into the first tubular shaft 22. A bearing 54 is interposed between the drive shaft 34 and the first tubular shaft 22, and a bearing 55 is interposed between the first tubular shaft 22 and the tubular bearing member 53. The front end of the first tubular shaft 22 is fixed to the base portion 3r of the first arm portion 3, and the rear end of the tubular bearing member 53 is fixed to the front face of the housing 51 at the upper portion.

Further, a first toothed driven pulley 25 is integrally formed at the rear end of the first tubular shaft 22, and a first toothed drive pulley 24 is attached to a motor shaft 23 of the first drive motor 21. An endless timing belt serving as a first-drive rotation transmission section 26 extends between and is wound around the first driven pulley 25 and the first drive pulley 24. Thus, a first rotational drive section 4 for rotating the first arm portion 3 is constituted.

Meanwhile, a connection shaft 15 is disposed such that the connection shaft 15 penetrates a distal portion 3f of the first arm portion 3 and a base portion 5r of a second arm portion 5. A rear intermediate portion of the connection shaft 15 is rotatably coupled to the distal portion 3f of the first arm portion 3 via a bearing 56, and a front intermediate portion of the connection shaft 15 is rotatably coupled to the base portion 5r of the second arm portion 5 via a bearing 57. Further, a tubular support shaft member 58 is disposed to surround the connection shaft 15, and a second tubular shaft 32 is disposed to surround the tubular support shaft member 58. In other words, the tubular support shaft member 58 is coaxially inserted into the outermost, largest second tubular shaft 32, and the connection shaft 15 is coaxially inserted into the tubular support shaft member 58. The inner circumferential surface of the front end of the tubular support shaft member 58 is fitted onto the outer circumference of the bearing 57, and the outer circumferential surface of the front end of the tubular support shaft member 58 is rotatably coupled to the base portion 5r of the second arm portion 5 via a bearing 60. Moreover, the rear end of the tubular support shaft member 58 is fixed to the distal portion 3f of the first arm portion 3. In this manner, the base portion 5r of the second arm portion 5 is supported by the distal portion 3f of the first arm portion 3. A bearing 61 is interposed between the tubular support shaft member 58 and the second tubular shaft 32, and the front end of the second tubular shaft 32 is fixed to the base portion 5r of the second arm portion 5.

Further, a second toothed driven pulley 36 is integrally formed at the rear end of the second tubular shaft 32, and a second toothed drive pulley 35 is attached to the drive shaft 34. An endless timing belt serving as a second drive rotation transmission section 37 extends between and is wound around the second driven pulley 36 and the second drive pulley 35. Thus, a second rotational drive section 6 for rotating the second arm 5 is constituted.

A support shaft 62 is fixed to the distal portion 5f of the second arm portion 5, and a second distal-side toothed pulley 14 is rotatably supported on the support shaft 62 via a bearing 63. A chuck 7 is fixed to an end surface of the second distal-side pulley 14. The chuck 7 has a function of holding and releasing a product (molded product) and generally employs a vacuum suction mechanism or a mechanical gripping mechanism.

Meanwhile, a first base-side toothed pulley 11 is formed at the front end of the tubular bearing member 53. Thus, the first base-side pulley 11 is disposed at the base portion 3r of the first arm portion 3 and is fixed to the support base 2. A first distal-side toothed pulley 12 is attached to the rear end of the connection shaft 15, and a second base-side toothed pulley 13 is attached to the front end of the connection shaft 15. Thus, the first distal-side pulley 12 is disposed at the distal portion 3f of the first arm portion 3, and the second base-side pulley 13 is disposed at the base portion 5r of the second arm portion 5. The first base-side pulley 11 has a diameter identical with that of the first distal-side toothed pulley 12, and the second base-side pulley 13 has a diameter identical with that of the second distal-side toothed pulley 14. An endless timing belt serving as a first rotation transmission section 16 extends between and is wound around the first base-side pulley 11 and the first distal-side toothed pulley 12, and an endless timing belt serving as a second rotation transmission section 17 extends between and is wound around the second base-side pulley 13 and the second distal-side toothed pulley 14.

The above-described product removal apparatus 1 of the present embodiment is attached to an injection molding machine in the following manner.

Figure 3:
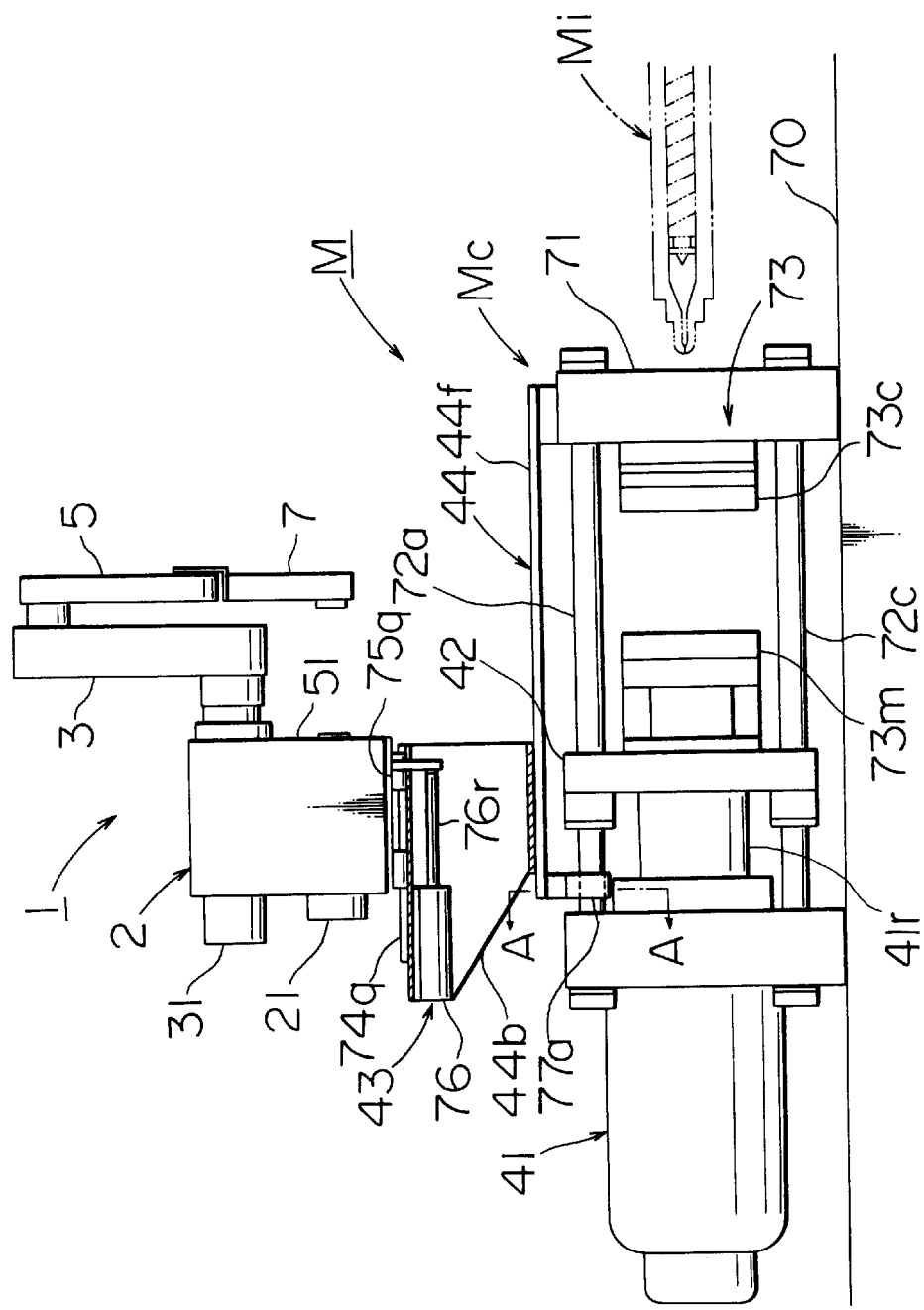
FIG. 3 is a side view of an injection molding machine to which the product removal apparatus is attached.
Figure 4:
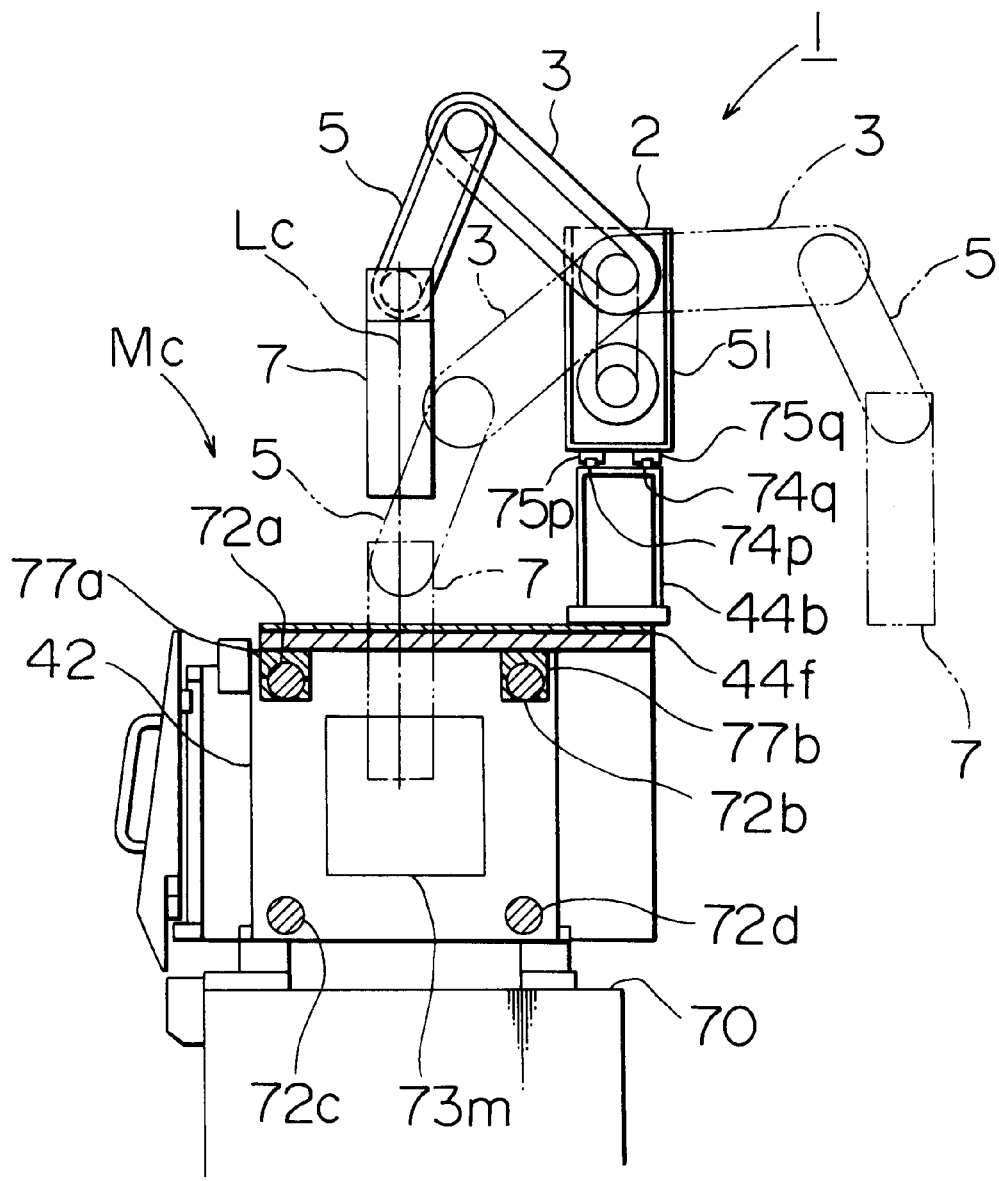
FIG. 4 is a front view of the injection molding machine including a sectional view taken along line A—A in FIG. 3.

FIGS. 3 and 4 show an injection molding machine (in-line-screw-type injection molding machine) M including an injection apparatus Mi and a mold clamp apparatus Mc disposed on a bed 70 of the injection molding machine. The mold clamp apparatus Mc includes a stationary platen 71 fixedly disposed on the bed 70 and a movable-platen drive unit 41 fixedly disposed on the bed 70 at a position separated from the stationary platen 71. Four tie bars 72a, 72b, 72c, and 72d are disposed between the stationary platen 71 and the movable-platen drive unit 41. The tie bars 72a to 72d support a movable platen 42 such that the movable platen 42 is slidable along the tie bars 72a to 72d. The distal end of a drive rod 41r of the movable-platen drive unit 41 is connected to the movable platen 42. A movable mold 73m is attached to the movable platen 42, and a stationary mold 73c is attached to the stationary platen 41. The movable mold 73m and the stationary mold 73c constitute a mold 73.

A support frame 44f is fixedly disposed on the mold clamp apparatus Mc. Specifically, the front end of the support frame 44f is fixed to the top surface of the stationary platen 71, and the rear end of the support frame 44f is fixed to the upper tie bars 72a and 72b at a location in the vicinity of the movable-platen drive unit 41. The support frame 44f supports a support base 44b, which, in cooperation with the support frame 44f, constitutes a support table 44. The position of attachment of the support base 44b on the support frame 44f can be adjusted freely. Right and left rails 74p and 74q are provided on the upper surface of the support base 44b, and sliders 75p and 75q attached to the bottom surface of the housing 51 (support base 2) are movably supported on the rails 74p and 74q. Thus, in the mold clamp apparatus Mc of the injection molding machine M, the support base 2 is disposed on the movable-platen drive unit 41 or between the movable-platen drive unit 41 and the movable platen 42. Further, an air cylinder 76 is attached to the support base 44b, and the distal end of a drive rod 76r of the air cylinder 76 is connected to the housing 51. Thus, there is constructed a moving mechanism section 43 for moving the support base 2 along the rails 74p and 74q or along the front/rear direction of the injection molding machine M. Reference numerals 77a and 77b denote split-type mount members for attaching the support frame 44f to the tie bars 72a and 72b.

Next, operation of the product removal apparatus 1 according to the present embodiment will be described with reference to the drawings.

In the product removal apparatus 1 according to the present embodiment, the first arm portion 3 and the second arm portion 5 constitute an articulated robot arm. In the robot arm, the first arm portion 3 moves as follows. Upon operation of the first drive motor 21, the motor shaft 23 rotates. The rotation of the motor shaft 23 causes rotation of the first drive pulley 24, which is transmitted to the base portion 3r of the first arm portion 3 via the first-drive rotation transmission section 26 (endless timing belt), the first driven pulley 25, and the first tubular shaft 22. Consequently, the first arm portion 3 swings, while the base portion 3r serves as a pivot point. The second arm portion 5 moves as follows. Upon operation of the second drive motor 31, the motor shaft 33 rotates. The rotation of the motor shaft 33 causes rotation of the drive shaft 34 and then rotation of the second drive pulley 35. The rotation of the second drive pulley 35 is transmitted to the base portion 5r of the second arm portion 5 via the second-drive rotation transmission section 37 (endless timing belt), the second driven pulley 36, and the second tubular shaft 32. Consequently, the second arm portion 5 swings, while the base portion 5r serves as a pivot point.

Figure 2:
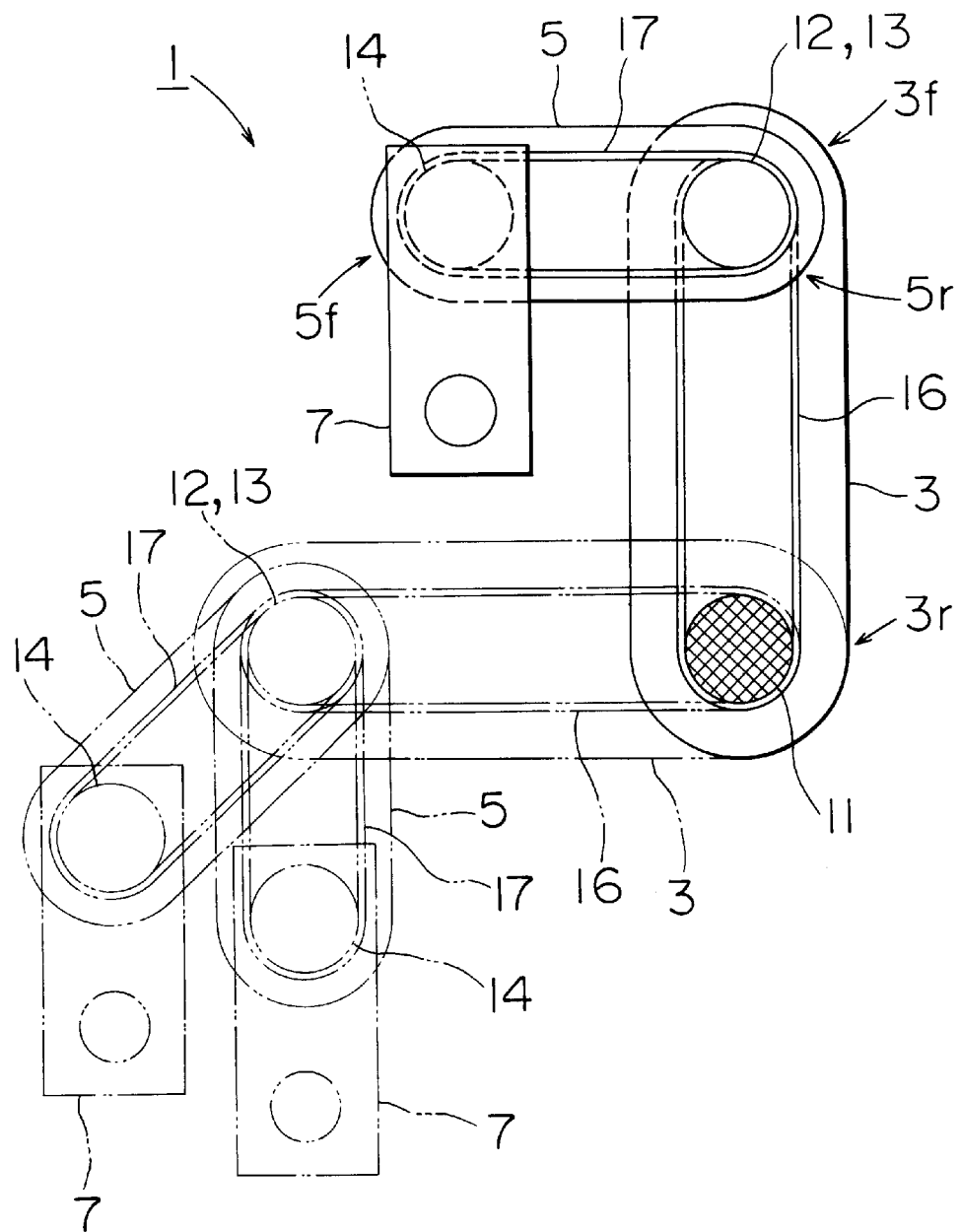
FIG. 2 is an explanatory view showing an operation of the product removal apparatus.

The chuck 7 is fixed to the second distal-side pulley 14, and the second distal-side pulley 14 is operatively connected to the first base-side pulley 11 via a rotation transmission mechanism including the second rotation transmission section 17, the second base-side pulley 13, the first distal-side pulley 12, and the first rotation transmission section 16, and the first base-side pulley 11 is fixed to the support base 2. That is, the chuck 7 is operative connected to the fixed first base-side pulley 11 via a rotation transmission system independent of drive systems of the first arm portion 3 and the second arm portion 5. Therefore, as shown in FIG. 2, when the diameter of the first base-side pulley 11 is rendered the same as that of the first distal-side pulley 12 and the diameter of the second base-side pulley 13 is rendered the same as that of the second distal-side pulley 14, rotation of the first arm portion 3 relative to the first base-side pulley 11 is transmitted to the chuck 7 as is, and rotation of the second arm portion 5 relative to the first arm portion 3 is transmitted to the chuck 7 as is. Since the first base-side pulley 11 is fixed and does not rotate, the chuck 7 has a constant orientation regardless of variations in the rotational angles of the first arm portion 3 and the second arm portion 5.

Accordingly, the chuck 7 can be moved linearly through a combined motion of the first and second arm portions 3 and 5, which is performed through simultaneous control of the rotational angles of the first and second arm portions 3 and 5. In addition, the orientation (posture) of the chuck 7 can be maintained constant. More specifically, as shown in FIG. 4, the chuck 7 can be moved vertically (in the Z-direction) along a straight line Lc, and the orientation of the chuck 7, which has a vertically elongated shape, is maintained constant. Therefore, even a large molded product can be stably and smoothly removed through a space between the tie bars 72a and 72b without causing interference with the tie bars 72a and 72b. Further, since neither a drive system nor a control system is required for correction of the orientation of the chuck 7, hardware and software can be simplified through reduction in the number of parts and simplification of the control system, so that the overall cost, size, and weight of the apparatus can be reduced.

While the present invention has been described with reference to the preferred embodiments, the present invention is not limited thereto. Regarding structural details, shapes, employed components, among others, modifications and any omission or addition may be possible as needed without departing from the scope of the invention. For example, in the above-described embodiment, an endless timing belt is used as a rotation transmission section for operatively connecting two pulleys. However, alternatively, an ordinary endless flat belt may be used. In this case, ordinary pulleys having no tooth may be used. Further, a gear mechanism including a plurality of meshed gears may be used as a rotation transmission section for operatively connecting two pulleys. In the embodiment, the robot for a production machine is used as a production removal apparatus for removing a product (molded product) from an opened mold of an injection mold machine. However, the robot for a production machine may be used as an insert-part-loading apparatus for loading an insert part into an opened mold. Moreover, the application of the robot for a production machine according to the present invention is not limited to injection molding machines, and the robot for a production machine according to the present invention can be utilized in other types of production machines which are subjected to restrictions similar to those of injection molding machines.

What is claimed is:

1. A robot for a production machine comprising:

a support base;

a first vertical arm portion having a first base portion supported on the support base;

a first rotational drive section for rotating the first arm portion;

a second vertical arm portion having a second base portion supported on a distal portion of the first arm portion, wherein said first and second vertical arms extend vertically in a direction parallel with a height of said support base and are rotatable in a direction normal to a horizontal direction of said support base;

a second rotational drive section for rotating the second arm portion;

a chuck supported on a distal portion of the second arm portion, wherein a first base-side pulley is disposed at the first base portion;

a first distal-side pulley is disposed at the distal portion of the first arm portion;

a second base-side, pulley is disposed at the base portion of the second arm portion; and a second distal-side pulley is disposed at the distal portion of the second arm portion, wherein the first base-side pulley is fixed to the support base, the chuck is fixed to the second distal-side pulley, the first distal-side pulley and the second base-side pulley are connected to each other via a connection shaft, the first base-side pulley and the first distal-side pulley are connected to each other via a first rotation transmission section, and the second base-side pulley and the second distal-side pulley are connected to each other via a second rotation transmission section.

2. A robot for a production machine according to claim 1, wherein the first base-side pulley has a diameter identical with that of the first distal-side pulley, and the second base-side pulley has a diameter identical with that of the second distal-side pulley.

3. A robot for a production machine according to claim 1, wherein the first rotational drive section comprises a first drive motor disposed on the support base; a first tubular shaft having a front end connected to the base portion of the first arm portion; a first drive pulley provided on a motor shaft of the first drive motor; a first driven pulley provided on a rear end of the first tubular shaft; and a first-drive rotation transmission section for operatively connecting the first drive pulley and the first driven pulley.

4. A robot for a production machine according to claim 3, wherein the second rotational drive section comprises a second drive motor disposed on the support base; a second tubular shaft having a front end connected to the base portion of the second arm portion; a drive shaft provided on a motor shaft of the second drive motor and penetrating the first tubular shaft; a second drive pulley provided on a front end of the drive shaft; a second driven pulley provided on a rear end of the second tubular shaft; and a second-drive rotation transmission section for operatively connecting the second drive pulley and the second driven pulley.

5. A robot for a production machine according to claim 1, wherein the support base is disposed on a movable-platen drive section of a mold clamp apparatus of an injection molding machine or between the movable-platen drive section and a movable platen, and the support base is provided on a moving mechanism section for moving the support base along a front/back direction of the injection molding machine.

6. A robot for a production machine comprising:

a support base, wherein the support base is disposed on a movable-platen drive section of a mold clamp apparatus of an injection molding machine or between the movable-platen drive section and a movable platen;

a first vertical arm portion having a first base portion supported on the support base;

a first rotational drive section for rotating the first arm portion;

a second vertical arm portion having a second base portion supported on a distal portion of the first arm portion, wherein said first and second vertical arms extend vertically in a direction parallel with a height of said support base and are rotatable in a direction normal to a horizontal direction of said support base;

a second rotational drive section for rotating the second arm portion;

a chuck supported on a distal portion of the second arm portion, wherein a first base-side pulley is disposed at the first base portion;

a first distal-side pulley is disposed at the distal portion of the first arm portion;

a second base-side pulley is disposed at the base portion of the second arm portion; and a second distal-side pulley is disposed at the distal portion of the second arm portion, wherein the first base-side pulley is fixed to the support base, the chuck is fixed to the second distal-side pulley, the first distal-side pulley and the second base-side pulley are connected to each other via a connection shaft, the first base-side pulley and the first distal-side pulley are connected to each other via a first rotation transmission section, and the second base-side pulley and the second distal-side pulley are connected to each other via a second rotation transmission section.

* * * * *